United States Patent [19]

Schnell

[11] 4,394,563

[45] Jul. 19, 1983

[54] FOOT CONSTRUCTION FOR PORTABLE ELECTRIC SPACE HEATERS

[75] Inventor: John W. Schnell, Boone County, Mo.

[73] Assignee: Toastmaster, Inc., Columbia, Mo.

[21] Appl. No.: 271,513

[22] Filed: Jun. 8, 1981

[51] Int. Cl.³ .................... F16M 11/20; F24H 9/06; H05B 1/00

[52] U.S. Cl. .................................. 219/342; 108/156; 248/188; 248/188.8; 219/366; 219/520

[58] Field of Search ............... 219/342, 345, 346, 347, 219/366, 367, 368, 377, 358, 363, 520; 108/153, 154, 155, 157, 159, 156; 248/151, 188, 73, 74.3, 165, 150, 440.5, 188.8

[56] References Cited

U.S. PATENT DOCUMENTS

| | | | |
|---|---|---|---|
| 1,154,412 | 9/1915 | Kuhn et al. | 219/377 |
| 1,520,241 | 12/1924 | Happe | 219/347 |
| 4,025,216 | 5/1977 | Hives | 108/153 |

Primary Examiner—B. A. Reynolds
Assistant Examiner—Teresa J. Walberg
Attorney, Agent, or Firm—Kokjer, Kircher, Bradley, Wharton, Bowman & Johnson

[57] ABSTRACT

An electric space heater having a pair of feet which are initially detached from the heater body to permit shipping in a small carton. The heater body has downwardly projecting fingers which are resilient in order to snap into receptacles of the feet when the feet are applied to the heater body for permanent attachment thereto. Curved ribs project downwardly between the opposing sets of fingers and act to upset the heater if an attempt is made to operate it without the feet attached. A tilt switch deactivates the heater when it is upset. When the feet are attached to the heater body, the ribs fit in sockets of the feet to permit normal heater operation.

2 Claims, 3 Drawing Figures

FOOT CONSTRUCTION FOR PORTABLE ELECTRIC SPACE HEATERS

BACKGROUND AND SUMMARY OF THE INVENTION

This invention relates generally to portable electric space heaters and more particularly to an improved foot structure for supporting the heater body on the floor or another surface.

Small electric space heaters have been used for some time to provide concentrated heating of localized areas such as relatively small rooms. The body or housing of the heater is normally mounted on a pair of spaced apart feet which support it during use on the floor, a table or counter top, or another surface. During manufacture of the heater, the feet are normally attached permanently to the underside of the heater body. As a result, a relatively large shipping container is required since the entire heater with the feet attached must fit within the carton.

If the feet are not attached at the factory, they must be attached by the consumer after purchase. Consequently, the manner of attachment of the feet to the heater body must be relatively simple in order to permit the feet to be installed quickly and easily by members of the general public. If the feet are not attached properly or not attached at all, the risk of fire is increased significantly. Thus, if the unit is shipped without the feet attached, provision should be made for preventing the heater from operating unless the feet are properly installed.

The present invention is directed to an improved foot construction for an electric space heater of this type. It is an object of the invention to provide a heater that is shipped with the feet detached from the heater body in order to minimize the size of the shipping carton. The feet can be simply and conveniently attached to the heater body by the consumer without the need for tools or other equipment. It is another important feature of the invention that the heater cannot be operated unless the feet are properly attached to the heater body.

In accordance with the invention, a pair of mounting plates are attached at the factory to the bottom of the heater body near its opposite ends. Each mounting plate is provided with two opposed sets of flexible fingers having enlarged heads. When each foot is inserted between the two sets of fingers during assembly by the consumer, the heads snap into place in receptacles formed in the opposite sides of the foot. Shoulders formed on the heads of the fingers are engaged against lips formed adjacent the receptacles in a manner preventing the feet from being detached from the heater body. Also projecting from each mounting plate is a rib having a curved lower edge. If an attempt is made to operate the heater without first attaching the feet, the curved ribs cause the heater to tip over and a conventional tilt switch or thermal cut off switch shuts the unit off.

DETAILED DESCRIPTION OF THE INVENTION

In the accompanying drawing which forms a part of the specification and is to be read in conjunction therewith and in which like reference numerals are used to indicate like parts in the various views.

Figure 1:
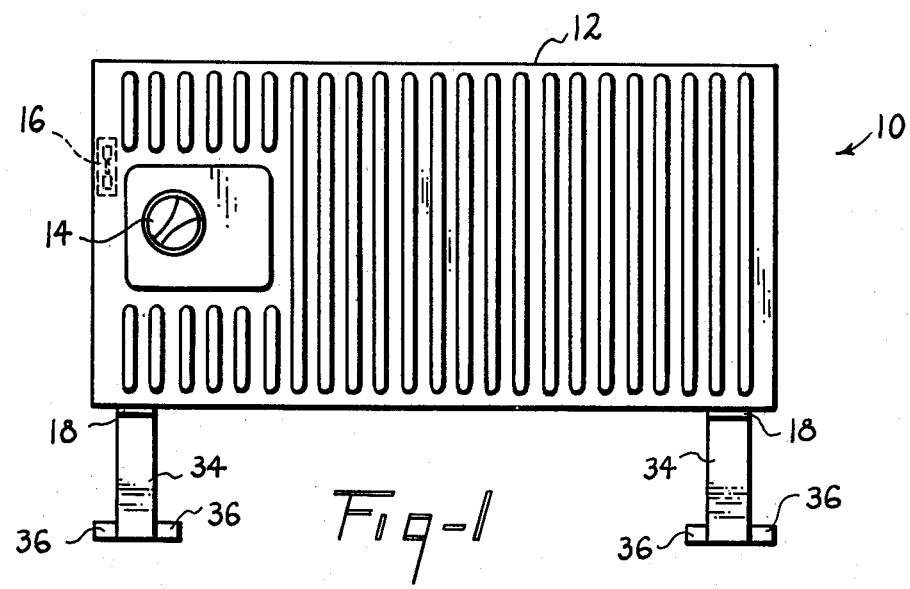
FIG. 1 is a front elevation view of a portable electric space heater which is supported on a pair of feet constructed according to a preferred embodiment of the present invention.

Referring now to the drawing in more detail and initially to FIG. 1, numeral 10 generally designates a portable electric space heater. The housing or body 12 of the heater has a box like configuration and is equipped internally with conventional electrical heating elements (not shown) for heating the air. The heated air is directed out the front of the unit. A dial 14 on the face of the heater body 12 controls the amount of heat generated by the unit. The heater includes an internal tilt switch 16 which acts in a well known manner to shut the unit off in the event that the heater body 12 is tipped over.

In accordance with the present invention, a pair of mounting plates 18 are permanently attached during manufacture to the flat bottom surface of heater body 12 near its opposite ends. Each mounting plate 18 has a pair of bolt holes 20 for receiving bolts (not shown) used to secure the mounting plate to the underside of the heater body.

Figure 2:
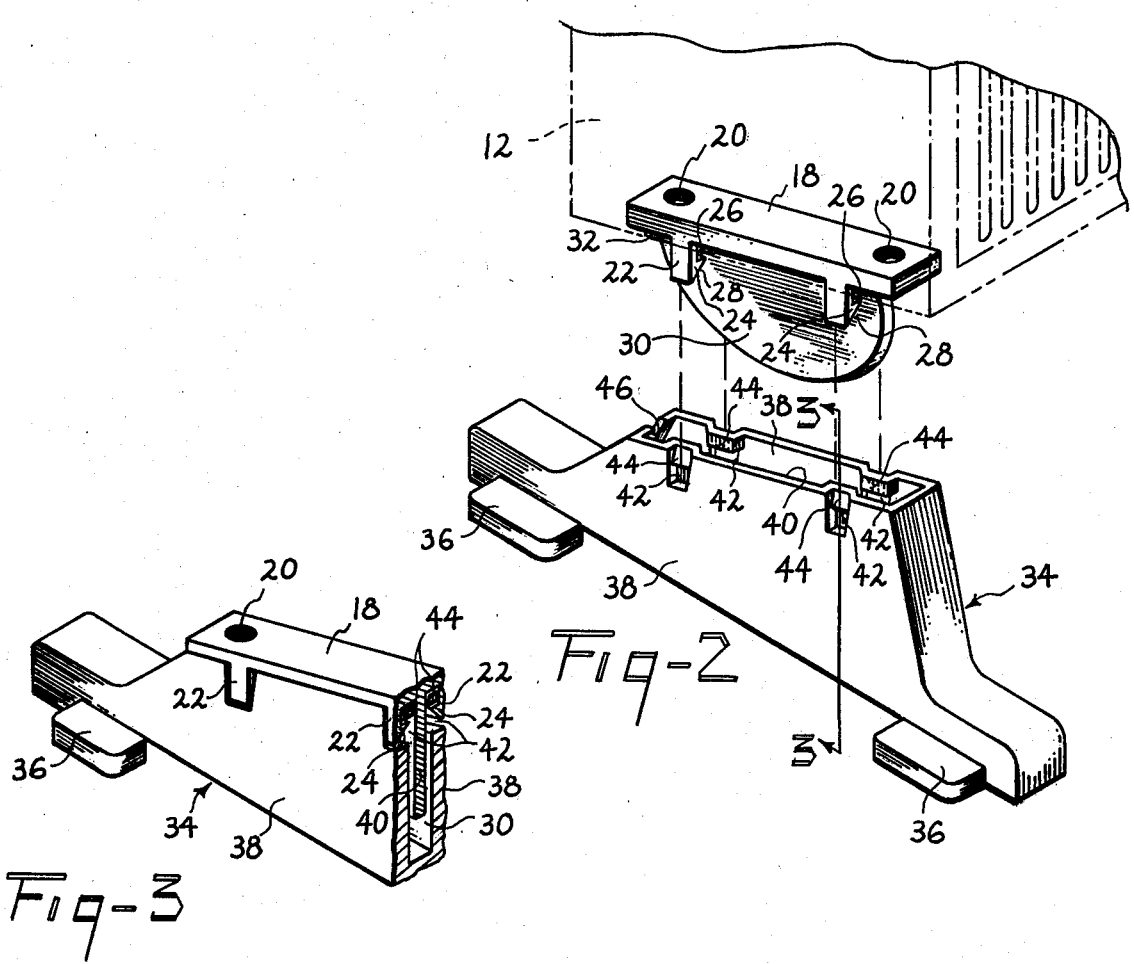
FIG. 2 is an exploded perspective view on an enlarged scale illustrating the manner in which the feet are connected with the heater body, the heater body being shown fragmentarily in broken lines.
Figure 3:
FIG. 3 is a cut away perspective view taken generally along line 3—3 of FIG. 2 in the direction of the arrows and showing the manner of attachment of the feet to the heater body.

Referring particularly to FIGS. 2 and 3, each of the long edge portions of each mounting plate 18 is provided with a pair of resilient lugs or fingers 22 which project generally downwardly from the mounting plate. The fingers 22 located along each edge of the mounting plate are spaced apart from one another. The set of fingers projecting from the opposite edges of each mounting plate 18 oppose one another, and each finger has on its lower or free end an enlarged head 24 which projects toward the head of the opposing finger (see FIG. 3). Each head 26 has a generally triangular shape and presents a flat shoulder 26 which faces upwardly toward the mounting plate. An inclined surface 28 angles from the edge of shoulder 26 to the lower tip of the finger.

A curved rib 30 projects downwardly from each mounting plate 18 at a location between the opposing sets of fingers 22. Rib 30 is generally semicircular in shape and has a curved lower edge which projects well below the lower ends of the fingers 22. A smaller rib 32 projects rearwardly from the back of rib 30 and terminates at the back edge of mounting plate 18. Both of the mounting plates 18 and the parts projecting therefrom are identical.

A pair of legs or feet 34 are initially detached from heater body 12 but may be attached thereto to support the unit on a floor or other surface. The feet 34 are constructed identically, and only one will be described in detail.

Referring particularly to FIG. 2, each foot 34 has a pair of base members 36 projecting from each side near its front and back ends for stable contact with the support surface on which the unit is operated. Near the center of each foot, a pair of parallel side walls 38 extend upwardly above the remainder of the foot and terminate in upper edges which incline upwardly from back to front. The side walls 38 are spaced apart to provide a socket 40 having sufficient size to receive the curved rib 30 when the feet are attached to the heater body. The incline of the upper edge of each side wall 38 results in the heater directing heated air slightly upwardly.

Each side wall 38 has a pair of openings which provide receptacles 42 for receiving the enlarged heads 24 of the flexible fingers 22. The receptacles 42 on each side wall are spaced apart to correspond with the spacing between the fingers 22. Immediately above each receptacle 42, a lip 44 is formed on the side wall 38 in order to engage the shoulder 26 of the corresponding finger, as will be explained more fully. Lips 44 are recessed from the surface of the side wall.

The surface of each foot 34 which extends between the back edges of side walls 38 to define the back end of socket 40 is provided with a small notch 46 on its top edge (FIG. 2). The size of the notch 46 is such that the small rib 32 fits closely therein when the foot is attached to the heater body.

During manufacture of the heater, the two mounting plates 18 are permanently bolted onto the underside of the heater body 12 at the factory. The feet 34 are initially detached from the heater body. Therefore, a much smaller shipping carton is required than in the case of a conventional unit having the feet attached at the factory. Since the feet are initially separate from the heater body in the present invention, the height is reduced and a much smaller shipping carton can be used.

The feet 34 can be attached by the consumer to the heater body simply by inserting each foot between the opposing sets of fingers 22 and pressing the foot upwardly toward mounting plate 18. During application of the foot to the heater body, the inclined surfaces 24 of heads 28 act against the surfaces of the foot above lips 44 in camming fashion to displace the heads of the opposing fingers away from one another as the heads approach receptacles 42. Once surface 28 has cleared the lip 44, heads 24 are in registration with receptacles 42, and the resiliency of fingers 22 snaps the heads into the receptacles and positions the shoulders 26 against the lips 44. The resiliency of the fingers thereafter retains heads 24 in receptacles 42 and maintains shoulders 26 in snug contact with lips 44 in order to prevent detachment of the legs from the heater body. The recessed location of each lip 44 positions the surface of the finger 22 flush with the surface of the adjacent side wall 38 to avoid the presence of abrupt offsets, as shown best in FIG. 3.

The large curved rib 30 fits within socket 40, and its curved edge is located well above the bottom of the foot. The small rib 32 of each mounting plate fits closely in the corresponding notch 46 to assure that the foot is properly positioned. In this manner, the feet 34 can be quickly and easily attached in permanent fashion to the heater body by the consumer.

It is an important feature of the invention that the heater 10 cannot be operated unless the feet 34 are attached to it. If an attempt is made to utilize the heater without the feet, the curved edges of ribs 30 contact the surface on which the unit is placed. The curvature of the ribs causes the heater body 12 to roll forwardly or rearwardly such that it is upset or tipped over. When this occurs, the tilt switch 16 automatically shuts the unit off. This safety feature thereby forces that consumer to properly attach the heater body to the mounting feet 34.

The heater may be equipped with a conventional thermal cut off switch (not shown) in place of the tilt switch. The thermal cut off switch would serve the same purpose as the tilt switch 16 and would act to shut the unit off in the event that it is tipped over.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. An electric space heater comprising:
   a heater body;
   a pair of mounting plates attached to said heater body at spaced apart locations thereon;
   a plurality of resilient fingers extending from each mounting plate, the fingers associated with each plate being arranged in a pair of opposing sets spaced apart from one another;
   an enlarged head portion of each finger projecting generally toward the corresponding finger of the opposing set, each head portion presenting a shoulder thereon;
   a pair of foot members adapted to rest on a support surface to support the heater body thereon, each foot member having spaced apart opposite sides for engaging the opposing sets of fingers;
   a plurality of receptacles in each side of each foot member sized and located to closely receive the heat portions of the corresponding fingers when the foot member is applied to the heater body between the opposing sets of fingers, each receptacle being bounded at the top by a lip against which the shoulder of the corresponding head portion is engaged in a manner to maintain the foot member attached to the heater body following application thereto;
   an electric space heater wherein a rib projects from each mounting plate at a location between the opposing sets of fingers, each rib terminating in a curved edge adapted to upset the heater body when placed on a support surface;
   means for deactivating the heater when the heater body is upset; and
   a socket in each foot member between the opposite sides thereof at a location to receive the corresponding rib when the foot member is applied to the heater body between the opposing sets of fingers.

2. In a portable electric space heater having a heater body, the combination of:
   a pair of foot members adapted to support the heater body on a support surface, said foot members being initially detached from the heater body;
   means for attaching said foot members to the heater body at spaced apart locations thereon to permit the foot members to support the heater body on a support surface;
   a pair of rib members projecting pgenerally downwardly from the heater body at spaced apart locations thereon, each rib member having a curved edge operable to upset the heater body when placed on a support surface while detached from said foot members;

means for deactivating the heater when the heater body is upset; and means presenting a socket in each foot member at a location to receive the corresponding rib when the foot member is attached to the heater body.

* * * * *